United States Patent
Edrington et al.

(10) Patent No.: US 7,210,030 B2
(45) Date of Patent: Apr. 24, 2007

(54) PROGRAMMABLE MEMORY INITIALIZATION SYSTEM AND METHOD

(75) Inventors: Jimmie D. Edrington, Georgetown, TX (US); Barry Wolford, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 456 days.

(21) Appl. No.: 10/897,345

(22) Filed: Jul. 22, 2004

(65) Prior Publication Data
US 2006/0020778 A1   Jan. 26, 2006

(51) Int. Cl.
*G06F 9/445* (2006.01)
*G06F 15/177* (2006.01)

(52) U.S. Cl. .............. 713/1; 713/2; 713/100; 710/10; 710/304; 711/1; 711/5; 711/170

(58) Field of Classification Search .......... 713/1, 713/2, 100; 710/10, 304; 711/1, 5, 170
See application file for complete search history.

(56) References Cited

U.S. PATENT DOCUMENTS

| | | | | |
|---|---|---|---|---|
| 5,896,846 A | * | 4/1999 | Bauer et al. | 123/510 |
| 6,154,834 A | * | 11/2000 | Neal et al. | 712/248 |
| 6,772,328 B1 | * | 8/2004 | Talbot et al. | 713/1 |

* cited by examiner

*Primary Examiner*—Rehana Perveen
*Assistant Examiner*—Nitin C. Patel
(74) *Attorney, Agent, or Firm*—Carr LLP; D'Ann Rifai

(57) ABSTRACT

The present invention provides for a system for programmable memory initialization. A configuration module is configured with initialization control commands and associated configuration information. An initialization module is coupled to the configuration module and a memory device and is configured to receive initialization control commands and associated configuration information from the configuration module, and to send memory initialization commands to the memory device based on received initialization control commands and associated configuration information.

21 Claims, 2 Drawing Sheets

PROGRAMMABLE MEMORY INITIALIZATION SYSTEM AND METHOD

TECHNICAL FIELD

The present invention relates generally to the field of computer memory devices and, more particularly, to a system and method for programmable memory initialization.

BACKGROUND OF THE INVENTION

Modern electronic devices often employ memory devices to store data and other information in analog and/or digital form. Some memory devices require initialization before data can be stored on the memory device. Initialization can entail supplying power to run the memory device, verifying connection continuity, verifying program operation or functionality, providing a command or sequence of commands, or other instructions to the memory device, and/or other suitable operations.

Initialization providing commands, sequences of commands, and/or other instructions is often performed by a memory controller, through a sequencer that generates applicable pre-defined device commands, with branches to provide for differences in devices or features used. While similar memory devices sometimes require similar initialization sequences, a generic pre-defined sequence that can initialize a variety of devices can be complex. With the increasing number of types of devices and optional features being developed, generic pre-defined sequences are also increasingly complex.

Moreover, pre-defined sequences can be difficult to configure to account for future initialization requirements. Additionally, developing memory technology can employ a variety of initialization sequences, even for similar devices, before an industry standard is formalized. For example, standards for extended mode (EMRS) registers in a DDR2-SDRAM ("Double Data Rate Two Synchronous Dynamic Random Access Memory") device are not fully defined by a standards group or manufacturer and subject to change.

Therefore, there is a need for a system and/or method for programmable memory initialization that addresses at least some of the problems and disadvantages associated with conventional systems and methods.

SUMMARY OF THE INVENTION

The present invention provides for a system for programmable memory initialization. A configuration module is configured with initialization control commands and associated configuration information. An initialization module is coupled to the configuration module and a memory device and is configured to receive initialization control commands and associated configuration information from the configuration module, and to send memory initialization commands to the memory device based on received initialization control commands and associated configuration information.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, user interface or input/output techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or in some combinations thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
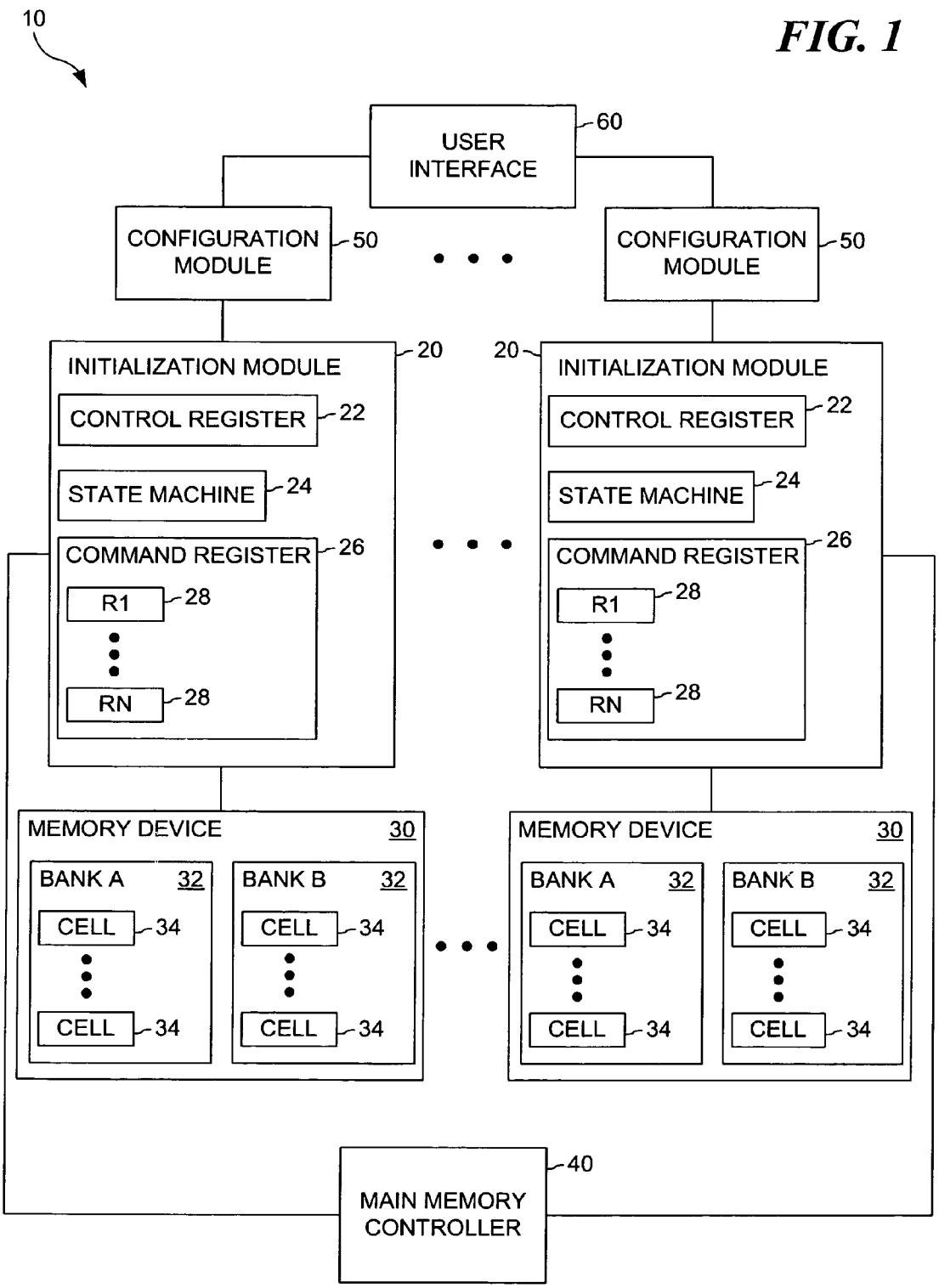
FIG. 1 is a block diagram depicting a programmable memory initialization system.

Referring to FIG. 1 of the drawings, the reference numeral 10 generally designates a memory system. Memory system 10 includes one or more initialization modules 20, one or more memory devices 30, a main memory controller 40, one or more configuration modules 50, and a user interface 60. Initialization modules 20 are coupled to a memory device 30 and main memory controller 40.

In the illustrated embodiment, each initialization module 20 is coupled to a particular memory device 30. Accordingly, each memory device 30 is coupled to a particular initialization module 20. As used herein, "each" means all of a particular subset. In an alternate embodiment, memory system 10 includes one initialization module 20, which is coupled to each memory device 30 of memory system 10. It will be understood to one skilled in the art that other configurations can also be employed.

Similarly, in the illustrated embodiment, each initialization module 20 is coupled to a particular configuration module 50. In an alternate embodiment, memory system 10 includes one configuration module 50, which is coupled to each initialization module 20 of memory system 10. In a particular embodiment, memory system 10 includes one configuration module 50 coupled to one initialization module 20, which is coupled to each memory device 30 of memory system 10. It will be understood to one skilled in the art that other configurations can also be employed.

Generally, memory system 10 can be configured as a general-purpose memory command generator to provide configurable memory initialization sequences, which can therefore incorporate a variety of functions and timings in memory device initialization. In operation, as described in more detail below, configuration module 50 provides initialization control commands and configuration information to initialization module 20. Initialization module 20 sends one or more memory initialization commands to memory device 30, based on the initialization control commands and configuration information. The initialization control commands and configuration information can be based on input received from a user through user interface 60, thereby providing configurable memory initialization commands that can be customized by a user to address a wide variety of possible types and configurations of memory device 30.

As described in more detail below, initialization modules 20 are configured to receive initialization control commands and configuration information from a configuration module 50, to request access to a memory device 30 from main memory controller 40, and to send memory initialization commands to the memory device 30. In a particular embodiment, initialization modules 20 include a control register 22, a state machine 24, and a command register 26.

Control register 22 is a register or other logical device suitable to be configured to receive initialization control commands and/or other initialization information. In one embodiment, control register 22 is a two-bit register with a first bit, the "START" bit, and a second bit, the "BUSY" bit. In one embodiment, as described in more detail below, the START bit is set by configuration module 50 through an initialization control command, wherein the START bit has a value of "0" or logic low during a first mode of operation, or "ordinary operation," and a value of "1" or logic high during a second mode of operation, or "initialization operation." As described in more detail below, in one embodiment, the BUSY bit is set by state machine 24, based on the value of the START bit, wherein the BUSY bit has a value of "0" or logic low when initialization module 20 is not in initialization operation mode, and a value of "1" or logic high when initialization module 20 is in initialization operation mode.

In an alternate embodiment, control register 22 can be configured as a component of a shared register that is configured to perform operations in addition to initialization operations. Similarly, control register 22 can be configured to perform or otherwise support additional operations, such as, for example, monitoring the status of initialization operations, identifying a particular type or class of memory devices on which to perform initialization operations, interrupting initialization operations, allowing or performing selective power-down of one or more particular types or classes of memory devices, and/or other suitable operations. In one embodiment, control register 22 can include additional bits that count through an initialization operation sequence, additional bits that identify a type or class of memory devices on which to perform initialization operations, and/or other suitable bits or components. It will be understood to one skilled in the art that other configurations can also be employed.

Initialization module 20 also includes state machine 24. State machine 24 is a logical state machine or other suitable device and is configured to receive initialization control commands and configuration information, and to send memory initialization commands to memory device 30, as described in more detail below. In a particular embodiment, state machine 24 is configured to recognize when a START bit of control register 22 is set to "1" or logic high, and to set a BUSY bit of control register 22. State machine 24 is further configured to request, from main memory controller 40, exclusive control of control signals of memory device 30, and to send memory initialization commands to memory device 30. As described in more detail below, in one embodiment, state machine 24 is also configured to retrieve memory initialization commands from command register 26.

Command register 26 is a register or group of registers or other suitable logical devices and is configured to receive and store configuration information, as described in more detail below. In a particular embodiment, command register 26 includes a plurality of configuration registers 28, labeled in the illustrated embodiment "R1" to "RN," where "N" is the number of configuration registers 28 in command register 26. Configuration registers 28 are registers or other suitable logical devices and are configured to receive and store configuration information. In a particular embodiment, configuration information includes one or more discrete memory initialization commands and each configuration register 28 is configured to receive and store a single memory initialization command. In an alternative embodiment, one or more configuration registers 28 can be configured to store more than one single memory initialization command. It will be understood to one skilled in the art that other configurations can also be employed.

In a particular embodiment, command register 26 includes sixteen configuration registers 28, and each configuration register 28 is a thirty-two-bit register. In one embodiment, the significance of each bit in each configuration register 28 is defined as follows. The first bit, "bit 0," indicates whether the remaining bits in the configuration register 28 constitute a valid command. As used herein, a "valid command" is a memory initialization command suitable to be decoded and processed by the particular memory device 30 to which initialization module 20 is coupled. For example, where memory device 30 is a DDR-SDRAM ("Double Data-Rate Synchronous Dynamic Random Access Memory"), a valid command can be a memory initialization command to set a mode register to a particular operating mode, such as, for example, a particular column address strobe (CAS) latency. It will be understood to one skilled in the art that other suitable valid commands can also be employed. In one embodiment, bit 0 is set to "1" or logic high when the remaining bits in the configuration register 28 constitute a valid command, and set to "0" when the remaining bits do not constitute a valid command, or are otherwise not significant to initialization of memory device 30.

Bits 1 through 8 define a wait time. In one embodiment, the wait time is measured in clock cycles and is the number of clock cycles between the first cycle after memory device 30 receives the command (as embodied by certain of the rest of the bits), and the next cycle wherein memory device 30 can receive a subsequent command. In an alternate embodiment, the wait time is the number of clock cycles, after state machine 24 sends the command to memory device 30, for state machine 24 to wait before sending a subsequent command to memory device 30. In an alternate embodiment, the wait time is the number of clock cycles between assertion of a first chip select signal after a first command and the clock cycle in which state machine 24 retrieves the contents of a subsequent command register 28, if any. It will be understood to one skilled in the art that other configurations can also be employed. In one embodiment, bit 9 is reserved. In an alternate embodiment, bits 1 through 9 define a wait time. In an alternate embodiment, bit 9 can be employed as a chip-select bit. It will be understood to one skilled in the art that other configurations can also be employed.

Bits 10 through 12 set the row address strobe (RAS), column address strobe (CAS), and write-enable (WE) fields of the command. Bits 13 through 15 set the bank address of the command. As described in more detail below, the bank address of the command can be employed to identify one or more of a plurality of banks of memory cells of memory device 30 to which the command applies. In an alternate embodiment, the bank address can be configured to identify one or more of a plurality of banks of memory devices 30 to which the command applies. It will be understood to one skilled in the art that other configurations can also be employed.

Bits 16 through 31 set the memory address of the command. In one embodiment, bits 16 through 31 identify a memory address location from which to load data into a mode register of memory device 30. In an alternate embodiment, bits 16 through 31 constitute an operational code that, combined with bits 10 through 12 and/or bits 10 through 15, is decoded by memory device 30 as a memory initialization command. In an alternate embodiment, bits 16 through 31 identify a memory address used to perform a memory read and/or write in conjunction with, or as a portion of, an initialization, test, and/or calibration procedure. For example, in a particular embodiment, bits 16 through 31 identify a memory address used to perform one or more memory read and write operations in conjunction with calibration operations of memory impedances and input/output timings. It will be understood by one skilled in the art that other configurations can also be employed. Thus, in the above-described embodiment, each configuration register 28 includes information indicating whether the register contains a valid command, the number of clock cycles after the command to wait before a subsequent command, and a memory initialization command and/or target portion of memory device 30 to which the command applies.

As described in additional detail below, in initialization operation mode, state machine 24 retrieves the contents of a configuration register 28 and sends a memory initialization command to memory device 30 based on the contents of the configuration register 28. In a particular embodiment, state machine 24 sends a memory initialization command to memory device 30 by putting the memory initialization command, as embodied by certain bits of configuration register 28, on control pins of memory device 30, and asserting a chip select signal on memory device 30.

In one embodiment, state machine 24 retrieves the contents of the configuration registers 28 in a pre-defined order. In a particular embodiment, the configuration registers 28 are configured in a pre-determined sequence from R1 to RN. After state machine 24 is granted exclusive control of the control signals of memory device 30, state machine 24 retrieves the contents of the first configuration register 28 in the sequence, the R1 configuration register. If the R1 configuration register 28 contains a valid command, state machine 24 sends a memory initialization command to memory device 30, based on the contents of the R1 configuration register 28. After the designated wait time, as indicated by bits 1 through 8 of the R1 configuration register 28 as described above, state machine 24 retrieves the contents of the R2 configuration register 28. In an alternate embodiment, state machine 24 retrieves the contents of the R2 configuration register 28 before the wait time designated in the R1 configuration register 28, but delays sending the memory initialization command embodied in the R2 configuration register 28 to memory device 30 until after the wait time designated in the R1 configuration register 28 has elapsed.

In one embodiment, state machine 24 repeats the above process, retrieving the contents of the RX configuration register 28, sending the embodied memory initialization command to memory device 30, allowing the designated wait time to elapse, and proceeding to retrieve the contents of the RX+1 configuration register 28, until encountering a configuration register 28 that does not contain a valid command, that is, where the first bit of the configuration register 28 is "0" or logic low. When state machine 24 encounters a configuration register 28 that does not contain a valid command, or there are no additional configuration registers 28, state machine 24 de-asserts the request for exclusive control of the control signals of memory device 30, and sets the control register 22 "BUSY" bit to "0" or logic low.

In an alternate embodiment, state machine 24 skips configuration registers 28 that do not contain a valid command, and proceeds to the next configuration register 28 that does contain a valid command. In an alternate embodiment, command register 26 is configured to identify configuration registers 28 that do not contain a valid command, and shifts the contents of the next configuration register 28 that does contain a valid command into an identified configuration register 28 that does not contain a valid command. In a particular embodiment, command register 26 repeats the process until there are no configuration registers 28 that do not contain a valid command located sequentially between two configuration registers 28 that do contain a valid command.

In an alternate embodiment, command register 26 includes an index configuration register, which is configured to identify which configuration registers 28 contain a valid command. In one embodiment, the R1 configuration register 28 is configured as an index configuration register. In one embodiment, where command register 26 includes sixteen configuration registers 28, the index configuration register is a sixteen-bit register, wherein each bit represents whether a particular configuration register 28 in the sequence contains a valid command. Thus, state machine 24 can be configured to read the contents of the index configuration register and cycle through the configuration registers 28 that are indicated to contain a valid command, without requiring state machine 24 to read the configuration registers 28 that are indicated not to contain a valid command.

Accordingly, the index configuration register can be employed to include or exclude one or more memory initialization commands in the sequence, which can support simplified configuration of initialization sequences for certain memory devices that are typically initialized with some, but not all, of the same memory initialization commands as certain other memory devices. Additionally, the index configuration register typically can be re-programmed more quickly than reloading all of the appropriate memory initialization commands to the configuration registers 28 to support a longer initialization sequence, which can result in a reduced amount of time between when initialization module 20 completes initialization of one memory device 30 and begins initialization of another memory device 30.

For example, where a memory device of Type "A" is typically initialized in a sequence of ten memory initialization commands, and a memory device of Type "B" is typically initialized in a sequence of the first five and eighth memory initialization commands of the Type "A" sequence, the index configuration register can be configured to indicate that the sixth, seventh, ninth, and tenth configuration registers do not contain valid commands when performing initialization operations on a Type "B" memory device. When performing initialization operations on a Type "A" memory device, the index configuration register can be configured to indicate that all of the configuration registers contain valid commands. Thus, by selectively setting the index configuration register, command register 26 can be employed to switch between similar initialization sequences, without completely reprogramming the configuration registers 28.

As described above, in one embodiment, command register 26 includes sixteen configuration registers 28. Thus, command register 26 can be configured to include sixteen discrete memory initialization commands. In one embodiment, the number of configuration registers 28 can be predetermined based on an expected number of memory initialization commands employed to initialize memory device 30. In an alternate embodiment, the configuration registers 28 can be cleared and reset to include additional commands.

For example, in an embodiment wherein command register 26 includes sixteen configuration registers 28 and twenty memory initialization commands are employed to initialize memory device 30, the first sixteen commands can be stored in the configuration registers 28. When the wait time indicated in the sixteenth (or R16) configuration register 28 has elapsed, the configuration registers 28 can be reset with the remaining four memory initialization commands, which state machine 24 can then process as described above. In one embodiment, the configuration registers 28 are reset after the last valid command has been sent to memory device 30 and the associated wait time has elapsed. In an alternate embodiment, the configuration registers 28 can be reset individually, after the wait time has elapsed for the memory initialization command that was previously stored in the particular configuration register 28, without waiting until the memory initialization commands stored in the remaining configuration registers 28 have been sent. It will be understood to one skilled in the art that other configurations can also be employed.

Initialization module 20 is coupled to memory device 30. Memory device 30 is a circuit or circuits or other suitable logic configured to store data, such as, for example, a flash memory, a synchronous dynamic random access memory (SDRAM), a single data-rate (SDR-) SDRAM, a double data-rate (DDR-) SDRAM, or other suitable memory device. In the illustrated embodiment, memory device 30 includes one or more banks 32 of memory cells 34. It will be understood to one skilled in the art that memory device 30 can also be configured with a single bank 32 of memory cells 34, one or more sub-banks in a bank 32, or otherwise suitably configured. Memory device 30 is further configured to receive memory initialization commands and perform tasks based on received memory initialization commands, as described above.

Initialization module 20 is also coupled to main memory controller 40. Main memory controller 40 is a circuit or circuits or other suitable logic configured to control or otherwise regulate access to one or more memory devices 30. In a particular embodiment, main memory controller 40 is configured to receive a request from initialization module 20 for exclusive access to control signals of a memory device 30, and to grant to initialization module 20 exclusive access to control signals of memory device 30, as described above. It will be understood to one skilled in the art that main memory controller 40 can also be configured to regulate access to one or more memory devices 30 during ordinary operations in addition to initialization operations, as well as to perform other suitable operations.

In the illustrated embodiment, memory system 10 also includes configuration module 50 and user interface 60. Configuration module 50 is coupled to initialization module 20 and user interface 60. Configuration module 50 is a circuit or circuits or other suitable logic or software, and is configured to receive user input from user interface 60 and to generate initialization control commands and configuration information based on received user input, as described above. User interface 60 is any suitable interface and is configured to interact with a user to receive user input and to transmit received user input to configuration module 50. In one embodiment, user interface 60 interacts with a user through one or more graphical user interfaces (GUIs). It will be understood to one skilled in the art that other suitable methods and systems for interacting with a user can also be employed.

As described in more detail below, in a particular embodiment, user interface 60 receives user input from a user, which is passed to configuration module 50. Generally, in one embodiment, the user input describes or includes a sequence of memory initialization commands the user desires the memory device 30 to execute during initialization of memory device 30. Configuration module 50 generates initialization control commands and configuration information based on the received user input, and sends the initialization control commands and configuration information to initialization module 20. As described above, initialization module 20 generally sends memory initialization commands to memory device 30 based on received initialization control commands and configuration information. An exemplary general sequence of operation of one embodiment is described with respect to FIG. 2.

Thus, memory system 10 can be employed as a general-purpose memory command generator with user-specified commands to initialize or otherwise control memory device 30 that include programmable timing for each command. Additionally, memory system 10 can be configured without a permanently fixed, pre-determined initialization command sequence for memory device 30. Therefore, memory system 10 can provide for a modifiable memory initialization sequence that can incorporate new and changing functions and timings of present and future memory devices. Accordingly, memory system 10 can reduce the costs associated with designing and manufacturing systems that incorporate developing or leading-edge-technology memory devices and would otherwise require additional design or revision of a previous pre-determined initialization command sequence.

Figure 2:
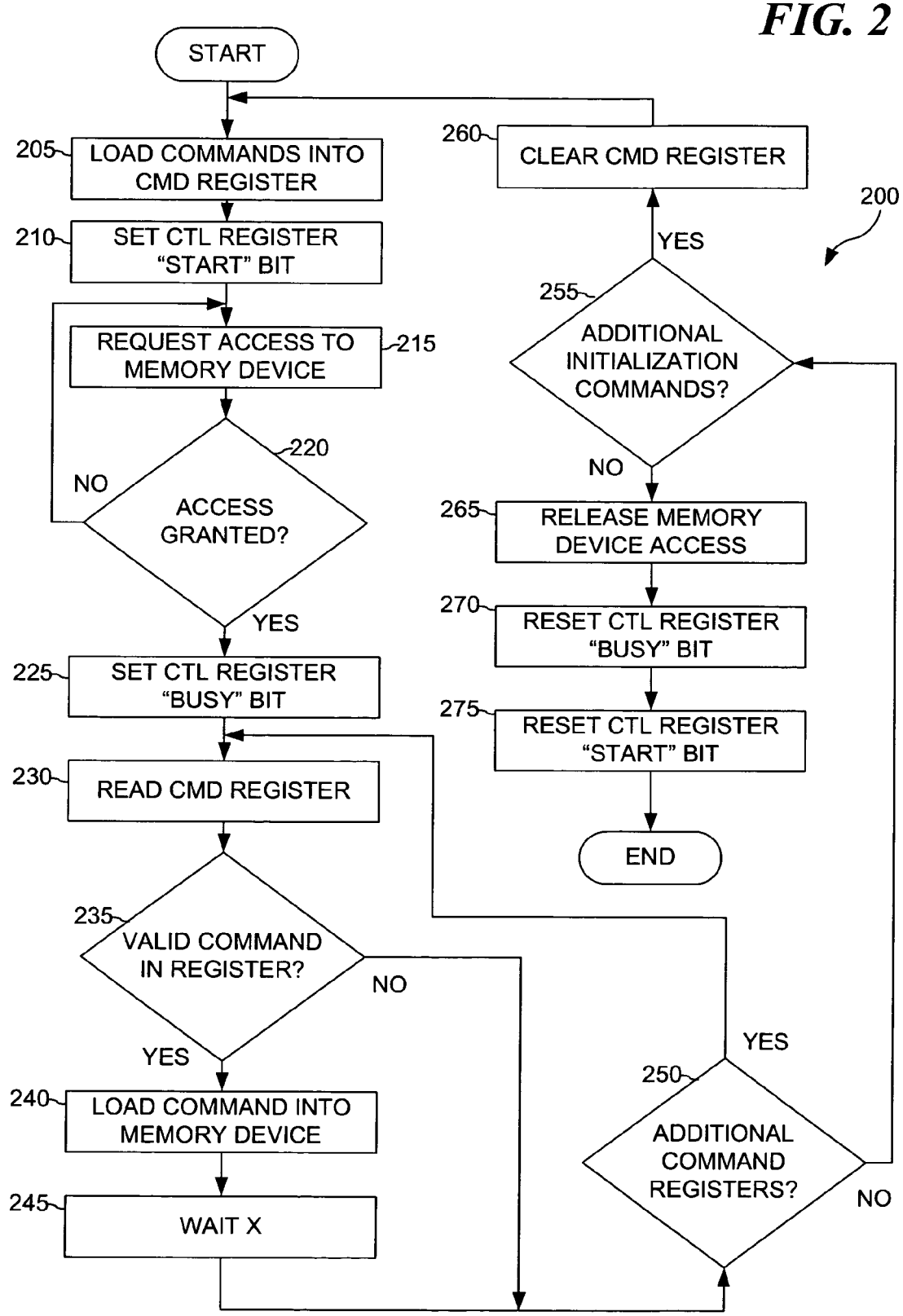
FIG. 2 is a flow diagram depicting a programmable memory initialization method.

Referring now to FIG. 2 of the drawings, the reference numeral 200 generally designates a flow chart depicting a programmable memory initialization method. In one embodiment, the steps of the method are performed by one or more components of memory system 10 of FIG. 1. The process begins at step 205, wherein memory initialization commands are loaded into a command register. This step can be performed by configuration module 50, based on user input received from user interface 60, loading memory initialization commands into command register 26 of FIG. 1. As described above, this step can include associated configuration information, and loading discrete memory initialization commands into one or more of a plurality of configuration registers 28 of FIG. 1.

At next step 210, a "START" bit of a control register is set. This step can be performed by configuration module 50, setting a START bit of control register 22 of FIG. 1. At next step 215, exclusive access to control signals of a memory device is requested. This step can be performed by state machine 24, requesting exclusive access to control signals of memory device 30, from main memory controller 40 of FIG. 1. In one embodiment, requesting exclusive access comprises asserting a digital signal in a logic high state and maintaining the digital signal in a logic high state until state machine 24 no longer requires exclusive access to the memory device 30 control signals.

At next decisional step 220, a determination is made whether exclusive access to control signals of the memory device has been granted. This step can be performed by state machine 24 of FIG. 1. In one embodiment, the determination is based on the logic state of a grant signal from main memory controller 40 of FIG. 1, wherein exclusive access is granted when the grant signal is in a logic high state. It will be understood to one skilled in the art that other suitable configurations can also be employed.

If at decisional step 220 exclusive access to the control signals of the memory device has not been granted, the process continues along the NO branch, returning to step 215. In one embodiment, this step can be combined with step 215, wherein exclusive access to the control signals of the memory device is persistently requested through a request signal maintained in a logic high state.

If at decisional step 220 exclusive access to the control signals of the memory device has been granted, the process continues along the YES branch to step 225. At step 225, a "BUSY" bit of the control register is set. This step can be performed by state machine 24, setting a BUSY bit of control register 22 of FIG. 1. At next step 230, the command register is read. This step can be performed by state machine 24 of FIG. 1. In one embodiment, this step includes reading the contents of a first configuration register 28 of a sequence or plurality of configuration registers 28 of command register 26 of FIG. 1.

At next decisional step 235, a determination is made whether there is a valid command in the command register. This step can be performed by state machine 24 of FIG. 1. In one embodiment, this step includes reading a first bit of a first configuration register 28 of FIG. 1. In an alternate embodiment, this step includes reading an index configuration register that is configured to indicate, whether a particular configuration register 28 includes a valid command.

If at decisional step 235 there is a valid command in the command register, the process continues along the YES branch to step 240. At step 240, the command is loaded into the memory device. This step can be performed by state machine 24 of FIG. 1. In one embodiment, this step includes state machine 24 sending a memory initialization command to memory device 30 of FIG. 1. In an alternate embodiment, this step includes state machine 24 placing the contents of the command register on control pins of memory device 30 and asserting a chip select signal to memory device 30.

At next step 245, a period of time, X, passes, and the process continues to decisional step 250. In one embodiment, this step is performed by state machine 24 waiting for X clock cycles, wherein X is defined by the second through ninth bits of the configuration register 28 that was read in step 230.

If at decisional step 235 there is not a valid command in the command register, the process continues along the NO branch to decisional step 250. In an alternate embodiment, the process continues to step 245, as described above, before continuing to decisional step 250. In an alternate embodiment, the process instead continues to decisional step 255, bypassing decisional step 250. It will be understood to one skilled in the art that other configurations can also be employed.

At decisional step 250, a determination is made whether there are additional command registers. This step can be performed by state machine 24 of FIG. 1. In one embodiment, this step includes determining whether there are configuration registers 28 that follow the configuration register 28 that was read in step 230 in a sequence of configuration registers 28. If at decisional step 250 there are additional command registers, the process continues along the YES branch, returning to step 230, wherein the next command register is read. In one embodiment, this step includes reading the next configuration register 28 in a sequence of configuration registers 28.

If at decisional step 250 there are no additional command registers, the process continues along the NO branch to decisional step 255. At decisional step 255, a determination is made whether there are additional memory initialization commands. This step can be performed by state machine 24 or configuration module 50 of FIG. 1. In one embodiment, this step includes determining whether there are additional memory initialization commands that exceed in number the number of configuration registers 28 of command register 26 of FIG. 1.

If at decisional step 255 there are additional memory initialization commands, the process continues along the YES branch to step 260. At step 260, the contents of the command register are cleared. This step can be performed by configuration module 50 or initialization module 20 clearing the contents of command register 26, and/or each configuration register 28, of FIG. 1. The process returns to step 205, wherein the additional memory initialization commands are loaded into the command register. In one embodiment, the process continues from step 205 to step 230, wherein the contents of the command register are read. It will be understood to one skilled in the art that steps 210 through 225 can be omitted where the process continues from step 260, unless changes in the system have occurred that would make any of the steps 210 through 225 non-redundant.

If at decisional step 255 there are no additional memory initialization commands, the process continues along the NO branch to step 265. It will be understood to one skilled in the art that decisional step 255 can be performed with respect to the particular memory device for which exclusive access has been granted, and that there can be additional memory initialization commands for other memory devices.

At next step 265, exclusive access to the memory device control signals is released. This step can be performed by state machine 24 of FIG. 1. In one embodiment, this step can include placing a request signal in a logic low state or de-asserting a request signal to main memory controller 40 of FIG. 1. At next step 270, the BUSY bit of the control register is reset. This step can be performed by state machine 24 of FIG. 1 setting the BUSY bit of control register 22 to a logic low state. At next step 275, the START bit of the control register is reset, and the process ends. This step can be performed by state machine 24 or configuration module 50 of FIG. 1.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A system for programmable memory initialization, comprising:

a configuration module configured with initialization control commands and associated configuration information; and an initialization module coupled to the configuration module and a memory device and configured to receive initialization control commands and associated configuration information from the configuration module, and to send memory initialization commands to the memory device based on received initialization control commands and associated configuration information.

2. The system as recited in claim 1, wherein the initialization module comprises:
a control register;
a state machine coupled to the control register; and
a command register coupled to the state machine.

3. The system as recited in claim 2, wherein the control register comprises a two-bit register.

4. The system as recited in claim 3, wherein a first bit of the control register is a START bit and a second bit of the control register is a BUSY bit.

5. The system as recited in claim 2, wherein the command register comprises a plurality of configuration registers.

6. The system as recited in claim 5, wherein at least one of the plurality of configuration registers is an index configuration register.

7. The system as recited in claim 5, wherein at least one of the plurality of configuration registers is a thirty-two-bit register.

8. The system as recited in claim 1, wherein the initialization control commands and associated configuration information comprise a thirty-two-bit digital signal.

9. The system as recited in claim 1, further comprising:
a user interface coupled to the configuration module and configured to receive user input from a user; and
the configuration module further configured to generate initialization control commands and associated configuration information based on received user input.

10. A method for programmable memory initialization, comprising:
loading a sequence of memory initialization commands and associated configuration information into an initialization module;
reading a first memory initialization command and first associated configuration information of the sequence of memory initialization commands and associated configuration information;
processing the first memory initialization command and first associated configuration information;
determining whether there are additional memory initialization commands and associated configuration information in the sequence of memory initialization commands and associated configuration information; and
if there are additional memory initialization commands and associated configuration information, processing each additional memory initialization command and associated configuration information.

11. The method as recited in claim 10, wherein processing the first memory initialization command and first associated configuration information comprises:
determining whether the first memory initialization command is a valid command based on the first associated configuration information; and
if the first memory initialization command is a valid command, sending the first memory initialization command to a memory device.

12. The method as recited in claim 11, further comprising waiting a period of time based on the first associated configuration information.

13. The method as recited in claim 10, further comprising:
receiving user input from a user; and
loading a sequence of memory initialization commands and associated configuration information based on received user input.

14. The method as recited in claim 10, further comprising:
determining whether an additional sequence of memory initialization commands and associated configuration information is required; and
if an additional sequence of memory initialization commands and associated configuration information is required, loading an additional sequence of memory initialization commands and associated configuration information.

15. A system for programmable memory initialization, comprising:
a user interface configured to receive input from a user;
a configuration module coupled to the user interface and configured to generate memory initialization commands based on received user input; and
an initialization module coupled to the configuration module, comprising:
a control register comprising a first control bit and a second control bit, the first control bit signifying a START status and the second control bit signifying a BUSY status;
a command register comprising sixteen thirty-two-bit configuration registers, wherein each thirty-two-bit configuration register comprises a first configuration bit signifying a valid command, a first set of seven bits following the first configuration bit and signifying a wait time, a first set of three bits following the first set of seven bits and signifying a row address strobe, column address strobe, and write-enable status, a second set of three bits following the first set of three bits and signifying a bank address, and a first set of sixteen bits following the second set of three bits and signifying a memory address; and
a state machine configured to read the first control bit in the control register, to set the second control bit in the control register, to request exclusive control of control signals of a memory device from a memory controller, to read the bits in each thirty-two-bit configuration register, to determine whether each thirty-two-bit configuration register contains a valid command based on the first configuration bit in each thirty-two-bit configuration register, and to send memory initialization commands to the memory device in a sequence based on valid commands in one or more thirty-two-bit configuration registers.

16. A method for programmable memory initialization, comprising:
loading at least two memory initialization commands and associated configuration information into a command register;
setting a START bit of a control register;
requesting exclusive access to control signals of a memory device;
setting a BUSY bit of the control register;
reading a first memory initialization command and first associated configuration information from the command register;
determining whether the first memory initialization command is a valid command;
if the first memory initialization command is a valid command, loading the first memory initialization command into the memory device;
waiting a number of clock cycles based on the first associated configuration information;
reading a second memory initialization command and second associated configuration information from the command register;

determining whether the second memory initialization command is a valid command;
if the second memory initialization command is a valid command, loading the second memory initialization command into the memory device;
waiting a number of clock cycles based on the second associated configuration information;
releasing exclusive access to control signals of the memory device;
setting the BUSY bit in the control register; and
setting the START bit in the control register.

17. A processor for programmable memory initialization, the processor including a computer program comprising:
computer code for loading a sequence of memory initialization commands and associated configuration information into an initialization module;
computer code for reading a first memory initialization command and first associated configuration information of the sequence of memory initialization commands and associated configuration information;
computer code for processing the first memory initialization command and first associated configuration information;
computer code for determining whether there are additional memory initialization commands and associated configuration information in the sequence of memory initialization commands and associated configuration information; and
computer code for, if there are additional memory initialization commands and associated configuration information, processing each additional memory initialization command and associated configuration information.

18. The processor as recited in claim 17, wherein the computer code for processing the first memory initialization command and first associated configuration information comprises:
computer code for determining whether the first memory initialization command is a valid command based on the first associated configuration information; and
computer code for, if the first memory initialization command is a valid command, sending the first memory initialization command to a memory device.

19. The processor as recited in claim 18, wherein the computer program further comprises computer code for waiting a period of time based on the first associated configuration information.

20. The processor as recited in claim 17, wherein the computer program further comprises:
computer code for receiving user input from a user; and
computer code for loading a sequence of memory initialization commands and associated configuration information based on received user input.

21. The processor as recited in claim 17, wherein the computer program further comprises:
computer code for determining whether an additional sequence of memory initialization commands and associated configuration information is required; and
computer code for, if an additional sequence of memory initialization commands and associated configuration information is required, loading an additional sequence of memory initialization commands and associated configuration information.

* * * * *